United States Patent [19]

Olvera

[11] Patent Number: 4,693,156

[45] Date of Patent: Sep. 15, 1987

[54] TABLE SAW ACCESSORY

[76] Inventor: Armando C. Olvera, 1126 E. Dewey, Alice, Tex. 78332

[21] Appl. No.: 761,859

[22] Filed: Aug. 2, 1985

[51] Int. Cl.[4] .................... B23Q 1/04; B27B 25/08; B27B 27/08

[52] U.S. Cl. .................... 83/422; 83/432; 83/435.1; 83/437; 83/474; 83/477.2; 83/478; 269/304; 384/53; 384/56

[58] Field of Search .................... 83/432, 435, 435.1, 83/437, 421, 477, 477.2, 478, 474; 269/304; 384/56, 53

[56] References Cited

U.S. PATENT DOCUMENTS

| | | | |
|---|---|---|---|
| 702,043 | 6/1902 | Zika | 143/6 |
| 2,502,124 | 3/1950 | Bray | 83/437 |
| 2,565,853 | 8/1951 | Jacobson | 384/53 |
| 2,881,812 | 4/1959 | Alumbaugh et al. | 143/52 |
| 3,456,541 | 7/1969 | Thompson et al. | 83/415 |
| 3,808,932 | 5/1974 | Russell | 83/860 |
| 3,830,127 | 8/1974 | James et al. | 83/435.1 |
| 3,880,032 | 4/1975 | Green | 83/478 |
| 3,986,420 | 10/1976 | Huntley et al. | 83/435.1 |
| 4,111,409 | 9/1978 | Smith | 83/435.1 |
| 4,123,955 | 11/1978 | Marlow | 83/435.1 |
| 4,206,672 | 6/1980 | Smith | 83/437 |
| 4,367,668 | 1/1983 | Jensen | 83/415 |
| 4,441,394 | 4/1984 | Barsotti | 83/435.1 |
| 4,464,962 | 8/1984 | Myhre | 83/437 |

*Primary Examiner*—Frank T. Yost
*Assistant Examiner*—Hien H. Phan
*Attorney, Agent, or Firm*—G. Turner Moller

[57] ABSTRACT

An accessory for a table saw comprises a plate having rollers thereon received in the parallel grooves of a conventional table saw. The rollers rotate about a vertical axis and act to guide the plate toward and away from the circular saw. A work piece is placed on the plate at a desired angle by an adjustable fence so that consistent, repetitive cuts in the work piece may be achieved.

11 Claims, 7 Drawing Figures

TABLE SAW ACCESSORY

This invention relates to an accessory for use on table type saws of the type in which a rotary saw blade extends upwardly out of a slot in a generally horizontal surface.

Table saws of this type are quite commonly used by professional carpenters as well as by hobbyists. These type saws are quite versatile since the saw blade can typically be inclined relative to the table surface. Since the work may be inclined relative to the blade, it will be seen that cuts of many different angles can be made in the work. Since table saws can also be used for ripping lumber as well as making simple perpendicular cuts in the work, it is not surprising that table type saws have become workhorses for professional carpenters and hobbiests.

One of the difficulties in using table saws lies in making repetitive consistent cuts in the work at an angle inclined to the long dimension of the work. The most common cut made, other than perpendicular to the long dimension of the work, is at a 45° angle. This type cut is made at every inside and outside corner on a wide variety of types of work, such as framing lumber, mill work, trim and the like.

It is not surprising that this problem has come to the attention of innovators who have designed accessories to be used on a table saw to assist in making these type cuts. Such accessories are included in the disclosures of U.S. Pat. Nos. 702,043; 2,881,812 3,456,541; 3,808,932; 3,830,127; 3,880,032; 4,111,409; 4,123,955; 4,206,672; 4,367,668; 4,441,394.

The purpose of the table saw accessory of this invention is to facilitate making consistent angular cuts in the work piece in a simple, expeditious manner. The preferred technique is to utilize the grooves existing in the top of most commercially available table saws. These grooves are parallel to the perpendicular position of the circular saw blade. Unfortunately, these grooves vary in width and in spacing from manufacturer to manufacturer. Thus, a successful table saw accessory must be adjustable to accommodate variations in commercially available table saws.

In summary, this invention comprises a table saw accessory comprising a plate adapted to move over the top of a conventional table saw. The plates comprises an elongate blade receiving slot, a plurality of rollers carried by the plate and extending into the grooves in the upper surface of the table saw and a work fence or rail so that the work can be captivated to the plate while the plate is moved toward and away from the circular saw blade. The rollers are mounted on the plate for rotation about a vertical axis so that the vertical walls of the table saw grooves act as a guide for moving the plate relative to the saw blade. The rollers are mounted for movement perpendicularly to the saw blade receiving slot so that the accessory of this invention can be adjusted to accommodate a variety of spacing between grooves of commercially available table saws.

It is accordingly an object of this invention to provide an improved table saw accessory.

Another object of this invention is to provide an improved table saw accessory which facilitates consistent repetitive inclined cuts in a work piece.

Other objects and advantages of this invention will become more fully apparent as this description proceeds, reference being made to the accompanying drawings and appended claims.

Figure 1:
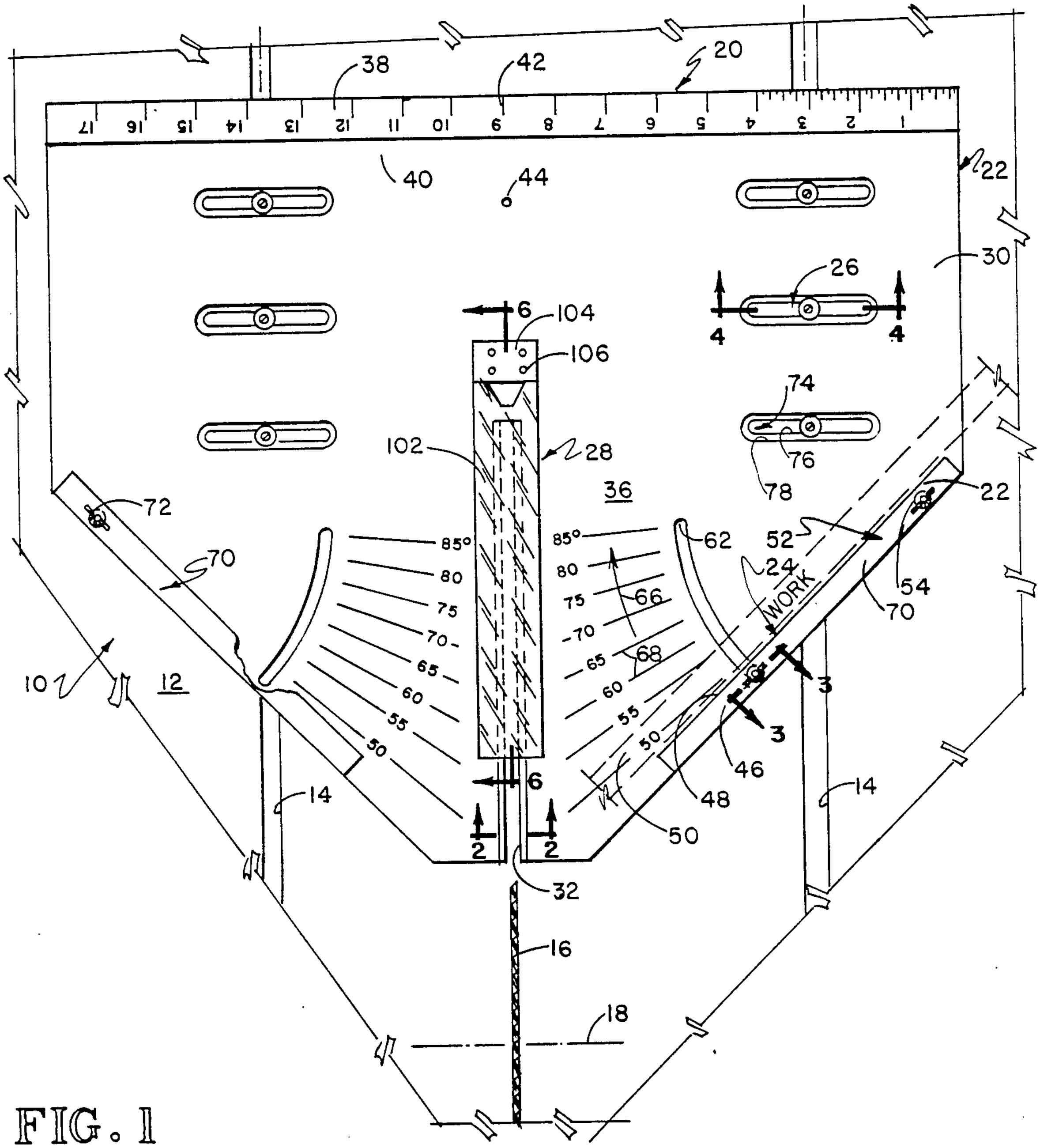
FIG. 1 is a top plan view of a table saw accessory of this invention illustrated on top of a conventional table saw.

Referring to FIG. 1, a more-or-less conventional table saw 10 comprises a generally horizontal upper working surface 12 having two or more grooves 14 therein which are parallel to the perpendicular position of a circular saw blade 16. Means (not shown) are provided for rotating the saw blade 16 about a horizontal axis 18 perpendicular to the grooves 14. Means are typically provided for adjusting the angular position of the saw blade 16 so that the axis 18 is inclined. Those skilled in the art will recognize the table saw 10 as being typical of commercially available table saws.

Located on the table saw 10 and adapted to co-operate with the grooves 14 is a table saw accessory 20 of this invention comprising as major components, a plate 22, one or more work fences or rails 24, roller means 26 for guiding movement of the plate 22 relative to the grooves 14 and a saw guard 28.

Figure 2:
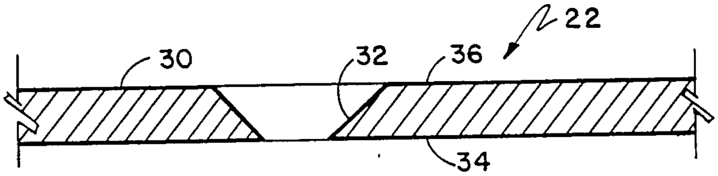
FIG. 2 is an enlarged cross-sectional view of the saw accessory of FIG. 1, taken substantially along line 2—2 thereof as viewed in the direction indicated by the arrows.

The plate 22 preferably comprises a generally planar section 30 of material, which may be metal or plastic, having an elongate generally linear saw blade receiving slot 32 therein. The plate 22 is conveniently of regular truncated generally pentagonal configuration having the slot 32 opening through the apex of the pentagon. As shown best in FIG. 2, the slot 30 diverges upwardly from a minimum width adjacent the lower surface 34 of the plate 22 to a maximum width adjacent the upper surface 36 thereof.

A ruler 38 or other measuring device is conveniently provided on the base 40 of the pentagonally shaped plate 22. The ruler 38 is conveniently affixed to the plate 22 providing an area of increased thickness and consequently of increased strength, although the indicia 42 of the ruler 38 may be embossed on or molded into the plate 22, as desired. An opening 44 is preferably provided in the plate 22 so that the accessory 20 may be suspended in a storage position, as from a nail.

The work fence or rail 24 preferably comprises an elongate section 46 of rigid material, such as metal or plastic, having a vertical face or shoulder 48 against which a work piece 50 may be captivated, as by the workman clasping the work piece 50 to the rigid section 46.

Figure 3:
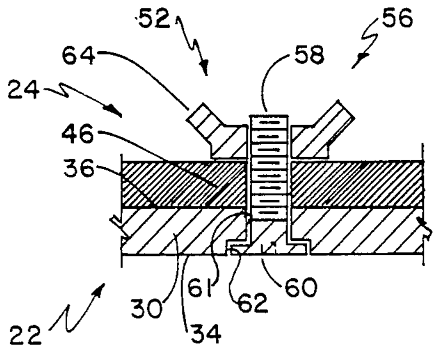
FIG. 3 is an enlarged cross-sectional view of the accessory of FIG. 1, taken substantially along line 3—3 thereof as viewed in the direction indicated by the arrows.

At the position illustrated in FIG. 1, the work fence 24 is disposed at a 45° angle relative to the saw blade receiving slot 32 and consequently at a 45° angle relative to the saw blade 16. Although a 45° cut is the most common acute angle cut to a workpiece, the work fence 24 is preferably adjustably pivotably mounted to the plate 22. As shown best in FIGS. 1 and 3, the adjustable mounting means 52 preferably comprises a pivot pin 54 allowing pivotal movement of the fence 24 and a clamping mechanism 56 for holding the fence 24 at a desired location. The clamping mechanism 56 includes exteriorally threaded fastener 58 having an enlarged head 60 received in an arcuate elongate passage 61 having an enlarged recess 68 in the lower surface 34 of the plate 22. Threadably receiving the fastener 58 is a wing nut 64 or other suitable fastener. It will accordingly be seen that the work fence 24 is mounted for adjustable pivotal movement in a clockwise direction indicated by the arrow 66 in FIG. 1 and may be clamped in any desired position. Preferably, suitable indicia 68 may be embossed or molded in the upper surface 36 of the plate 22 to provide other angles of approach between the saw blade 16 and the work piece 50.

Desirably the accessory 20 includes a second work fence 70 on the opposite side of the slot 32 having a pin means 72 adjustably pivotally mounting the fence 70 on the plate 22 and a clamping mechanism (not shown) for temporarily receiving the fence 70 in position. It will be seen that the work fence 70 is mounted for adjustable pivotal movement in a counterclockwise rotation opposite from the work fence 24.

Figure 4:
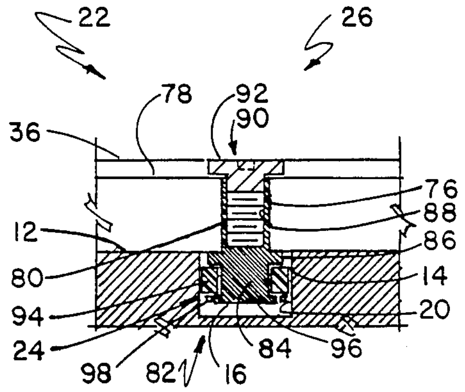
FIG. 4 is an enlarged cross-sectional view of the accessory of FIG. 1, taken substantially along line 4—4 thereof as viewed in the direction indicated by the arrows.
Figure 5:
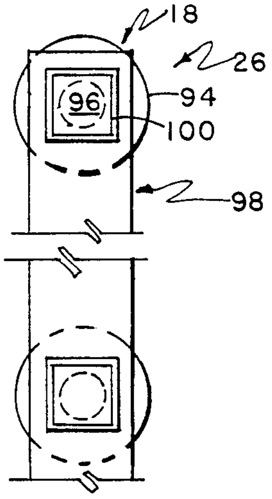
FIG. 5 is a bottom view of the device of this invention.

Referring to FIGS. 1, 4 and 5, the roller means 26 comprise a plurality of elongate linear passages 74 in the plate 22 perpendicular to the saw blade receiving slot 32. The passages 74 comprise an elongate slot 76 extending through the plate 30 and an enlarged recess 78 adjacent the upper surface 36 of the plate 22. Positioned in the passage 76 is an upper end 80 of a roller support 82. The roller support 82 comprises a lower end 84 separated from the upper end 80 by an enlarged rib 86 of greater dimension than the slot 76. The upper end 80 of the roller suppport 82 provides interior threads 88 for receiving a threaded fastener 90 having an enlarged head 92. It will accordingly be seen that the enlarged head 92 of the threaded fastener 90 and the rib 86 captivate the roller support 82 to the table 22. A roller 94 is rotatably mounted on the lower support end 84 which provides a lowermost flange 96 for purposes more fully explained hereinafter.

As shown best in FIG. 4, the roller support 82 is shallower than the depth of the groove 14 so that the weight of the plate 22 and the exertions of the user are carried on the upper surface 12 of the table saw. The co-action between the rollers 94 and the groove 14 act merely to control the direction of movement of the accessory 20. Since the horizontal dimension of the roller 94 is less than that of the slot 14, it will be seen that the workmen need only push the plate 22 toward the side of engagement of the roller 94 and the groove 14 to maintain the proper relationship between the saw blade 16 and the work 50.

There is a tendency for the roller support 82 to rotate relative to the fastener 90 in an unthreading direction to thereby become loose. It will be appreciated that this is somewhat disconcerting. To overcome this difficulty, one of several approaches are quite suitable. Simplest, the upper roller support end 80 may be of rectilinear or polygonal cross-section to be received in the slot 76 which also has parallel walls. In this fashion, it will be seen that the upper roller support end 80 cannot rotate relative to the plate 22 so that there is not possibility of unthreading movement of the roller support 82.

In the alternative, and as shown in FIG. 5, a link 98 having a square opening 100 may be pressed over and captivated on the square flange 96 of adjacent roller means 26. It will be evident that neither of the square flanges 96 can rotate which will prevent rotation of either of the roller supports 82.

Figure 6:
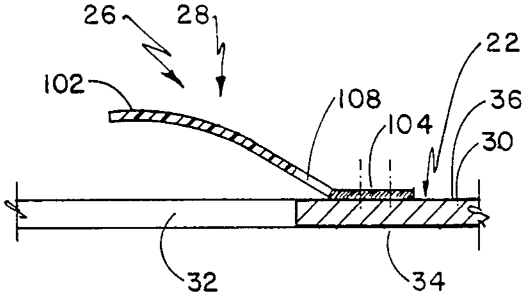
FIG. 6 is a cross-sectional view of the accessory of FIG. 1, taken substantially along line 6—6 thereof as viewed in the direction indicated by the arrows.
Figure 7:
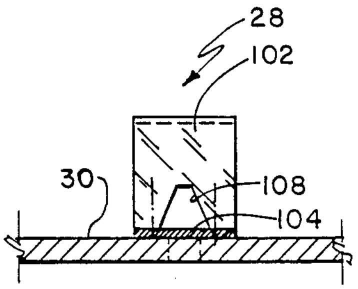
FIG. 7 is a rear view of the illustration of FIG. 6.

Referring to FIGS. 6 and 7, the saw guard 28 is shown in greater detail and comprises an arcuately shaped shielding portion 102 cantilevered over the slot 92 and a connecting section 104 secured to the plate 22 in any suitable fashion, as by the provision of spaced fasteners 106. The shielding section 102 is preferably transparent allowing the user to see the blade 16 through the saw guard 28. An opening 108 is provided in the saw guard 28 adjacent the connecting section 104 to allow cuttings to pass through the saw guard 28.

Although the invention has been described in its preferred forms with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. An accessory for use in combination with a stationary saw table having a generally horizontal upper surface providing at least two parallel grooves and a circular saw blade projecting upward through the horizontal surface parallel to the grooves, comprising a plate having upper and lower surfaces, an elongate blade receiving slot through which the saw blade is extendible and a support receiving opening;

means carried by the plate and mounting the plate for movement on the table parallel to the saw blade, including at least a pair of rollers parallel to the blade receiving slot and means mounting each the rollers for rotary movement about a vertical axis and comprising a support having an upper end received in an opening of the plate and providing a screw thread, a lower end projecting below the plate for receipt in the table groove and having a polygonal stud thereon, a lip between the upper and lower ends, a threaded fastener received on the upper end screw thread for rigidly captivating the support on the plate, the roller being rotatable on the lower end; and means preventing rotation of the support comprising a link received on each of the studs; and a work rail, on the upper surface of the plate, comprising a shoulder against which a work piece abuts, the work piece being extendible across the saw blade receiving slot.

2. The accessory of claim 1 further comprising means mounting the work rail for movement about a vertical axis for positioning the work piece at a multiplicity of angles relative to the saw blade receiving slot.

3. The accessory of claim 2 wherein the work rail is on one side of the saw blade receiving slot and further comprising a work engaging member including means mounting the work engaging member for pivotal movement about a vertical axis in counter-rotary relation to the work rail.

4. The accessory of claim 1 wherein the saw blade receiving slot diverges from a first width dimension at the lower plate surface to a second width dimension larger than the first dimension, at the upper plate surface.

5. The accessory of claim 1 further comprising a saw guard carried by the plate, the saw guard having an arcuate upper surface overlying the saw blade receiving slot.

6. The accessory of claim 5 wherein the saw guard adjoins the plate at a predetermined location and provides a cuttings removal opening adjacent the predetermined location.

7. An accessory for use in combination with a stationary saw table having a generally horizontal upper surface providing at least two parallel grooves and a circular saw blade projecting upward through the horizontal surface parallel to the grooves, comprising a plate having upper and lower surfaces, an elongate blade receiving slot through which the saw blade is extendible and a rectilinear support receiving opening;

means carried by the plate and mounting the plate for movement on the table parallel to the saw blade, including at least a pair of parallel rollers and means mounting the rollers for rotary movement about a vertical axis and comprising a support having an upper polygonal end received in the rectilinear opening of the plate and providing a screw thread, a lower end projecting below the plate for receipt in the table groove, a lip between the upper and lower ends, a threaded fastener received on the upper end screw thread for rigidly captivating the support on the plate, the roller being rotatable on the lower end; and means preventing rotation of the support comprising the relationship between the rectilinear plate opening and the polygonal upper support end; and a work rail, on the upper surface of the plate, comprising a shoulder against which a work piece abuts, the work piece being extendible across the saw blade receiving slot.

8. The accessory of claim 7 further comprising means mounting the rollers for movement perpendicular to the saw blade receiving slot.

9. The accessory of claim 7 wherein the plate includes a linear base edge, a pair of generally parallel side edges, a pair of converging front edges and a top edge parallel to the base edge, the saw blade receiving slot opening through the top edge.

10. The accessory of claim 9 wherein the plate is generally planar and further comprising a ruler having a pair of parallel edges, the ruler being affixed to the upper surface of the plate and having one of the ruler edges extending along the base edge of the plate.

11. The accessory of claim 7 wherein the roller is of arcuate external periphery and the roller mounting means mounts the roller for rolling movement along the arcuate periphery.

* * * * *